(12) United States Patent
Kishi et al.

(10) Patent No.: US 7,119,455 B2
(45) Date of Patent: Oct. 10, 2006

(54) AUTOMOTIVE ELECTRONIC DEVICE

(75) Inventors: Naotaka Kishi, Kanagawa (JP); Kenji Nunokawa, Miyagi (JP)

(73) Assignee: Sony Corporation, (JP)

( * ) Notice: Subject to any disclaimer, the term of this patent is extended or adjusted under 35 U.S.C. 154(b) by 586 days.

(21) Appl. No.: 10/353,509

(22) Filed: Jan. 29, 2003

(65) Prior Publication Data
US 2003/0155479 A1    Aug. 21, 2003

(30) Foreign Application Priority Data
Feb. 13, 2002   (JP)   ............................. P2002-034993

(51) Int. Cl.
*B60L 1/00* (2006.01)
(52) U.S. Cl. ...................................................... 307/9.1
(58) Field of Classification Search .............. 307/10.2, 307/9.1

See application file for complete search history.

(56) References Cited

U.S. PATENT DOCUMENTS 6,683,390 B1 *   1/2004   Miura ........................ 307/10.2

* cited by examiner

*Primary Examiner*—Robert L. DeBeradinis
(74) *Attorney, Agent, or Firm*—Lerner, David, Littenberg, Krumholz & Mentlik, LLP

(57) ABSTRACT

A CD player includes a device main body, a blind panel that covers the front surface panel side of the device main body, an operating part for operating the device main body, a display part for displaying the contents of an operation, and a blind panel moving and operating mechanism for moving the blind panel between a shield position where the front surface panel side is shielded and an operative position where the front surface panel side is exposed and the operating part can be used. The operating part is arranged on a surface opposed to the front surface panel of the device main body in the shield position of the blind panel, and the display part is arranged on the front surface panel of the device main body. The size of the operating part and the size of the display part are enlarged to improve an operability and a viewability of the display part.

5 Claims, 8 Drawing Sheets

AUTOMOTIVE ELECTRONIC DEVICE

BACKGROUND OF THE INVENTION

1. Field of the Invention

The present invention relates to an automotive electronic device in which the front surface side of a device main body is covered with a blind panel to hide its existence, so that the electronic device can be protected from a robbery.

2. Description of the Related Art

Automotive electronic devices such as a CD player, a DVD player or a car navigation device may be possibly stolen by breaking window glass when the existence thereof is known outside the vehicle.

In order to protect the electronic device from the above-described robbery, an automotive electronic device as disclosed in, for instance, Japanese Patent Application Laid-Open No. hei 9-123842 has been developed. As shown in FIGS. 9A to 9D, an automotive electronic device 101 has an operating panel 103 arranged in the front part of a device main body 102. The operating panel 103 is moved by a panel driving and operating mechanism (not shown) between a first position (see FIG. 9A) in which an operating surface 104 is located in a front surface and a second position (see FIG. 9D) in which a surface 105 except the operating surface of the operating panel 103 is located in the front surface. Further, as shown in FIGS. 10A and 10B, there has been an electronic device that an operating part 106 and a display part 107 are provided on the front surface of a device main body 102, they are covered with a blind panel (blindfold panel) 108 to hide the existence of the automotive electronic device when they are not used, and the blind panel 108 is moved to a position in which the blind panel 108 does not interfere with the operating part 106 and the display part 107 upon using.

In the above-described conventional automotive electronic device, since both the operating part 106 and the display part 107 are arranged on the operating surface 104 of the operating panel 103 or the front surface of the device main body 102, there have been such problems as described below.

Since the operating part 106 and the display part 107 undergo a spatial restriction due to their existence, so that the size of the operating part 106 or the display part 107 cannot be enlarged. Therefore, the operability of the operating part 106 or the visibility of the display part 107 is not good.

Further, since the operating part 106 and the display part 107 are provided on the same surface, a part of the display part 107 is inconveniently hidden by the tips of fingers by which the operating part 106 is operated. Therefore, sometimes, the display part 107 is hardly visually recognized while operating the operating part 106.

SUMMARY OF THE INVENTION

The present invention is proposed by considering the above-described problems and it is an object of the present invention to solve the conventional problems by arranging an operating part and a display part not on the same surface, but on respectively different surfaces.

According to the present invention, there is provided an automotive electronic device comprising a device main body; a blind panel with which the front surface side of the device main body is covered; an operating part for operating the device main body; a display part for displaying the contents of an operation; and a blind panel moving and operating mechanism for moving the blind panel between a shield position where the front surface side of the device main body is covered and shielded and an operating part usable position where the front surface side is exposed and the operating part can be used, wherein the operating part is arranged on a surface opposed to the front surface of the device main body in the shield position of the blind panel and the display part is arranged in the front surface side of the device main body.

BRIEF DESCRIPTION OF THE DRAWINGS

The object and other objects and advantages of the present invention will be apparent more clearly from the following specification in conjunction with the accompanying drawings in which.

DETAILED DESCRIPTION OF THE PREFERRED EMBODIMENTS

Now, an automotive electronic device according to the present invention will be described by way of an example in which the automotive electronic device is formed as an automotive disc drive device (refer it to as a CD player, hereinafter).

Figure 1:
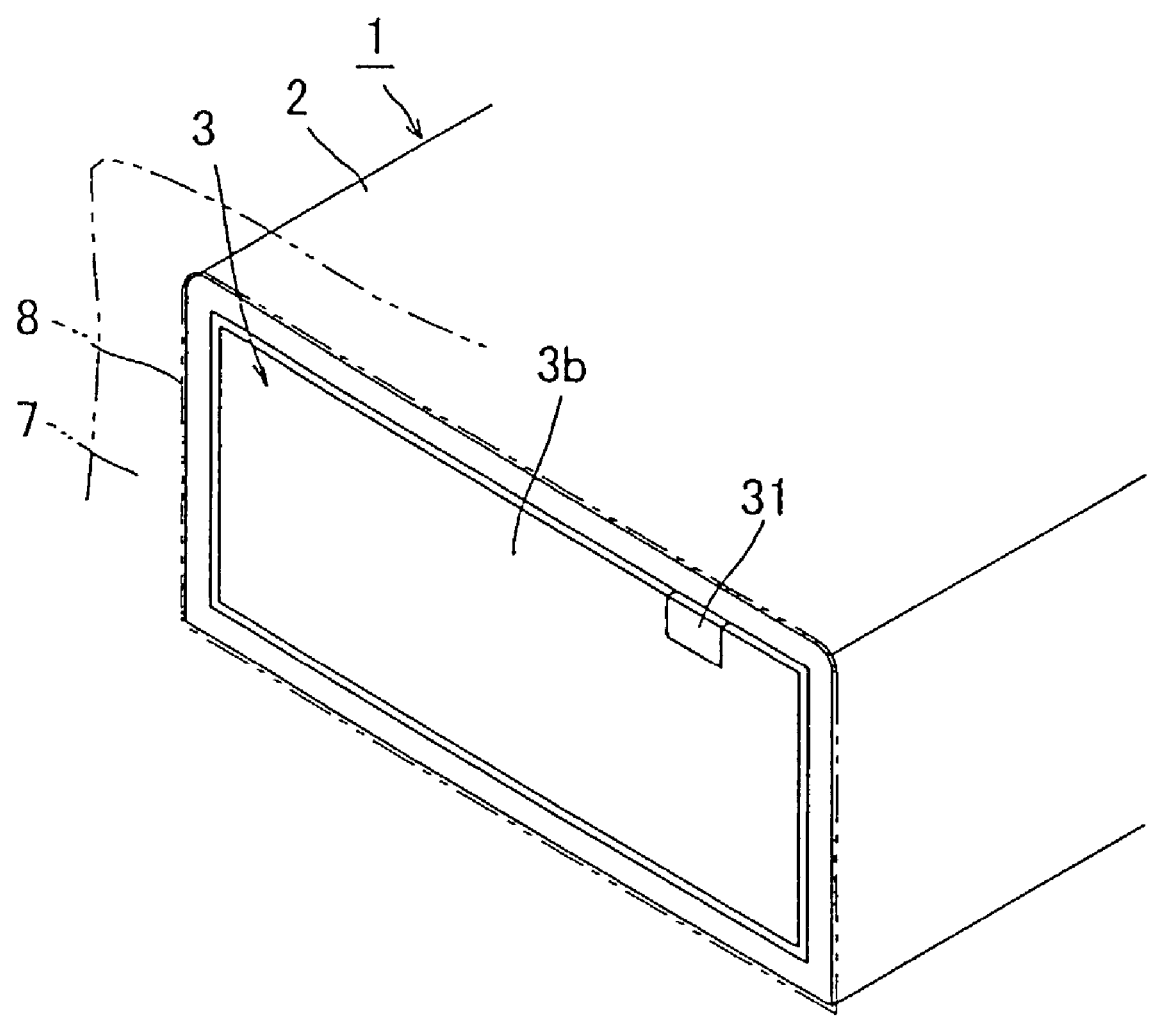
FIG. 1 is a perspective view showing an automotive electronic device of a first embodiment in a using state.
Figure 2:
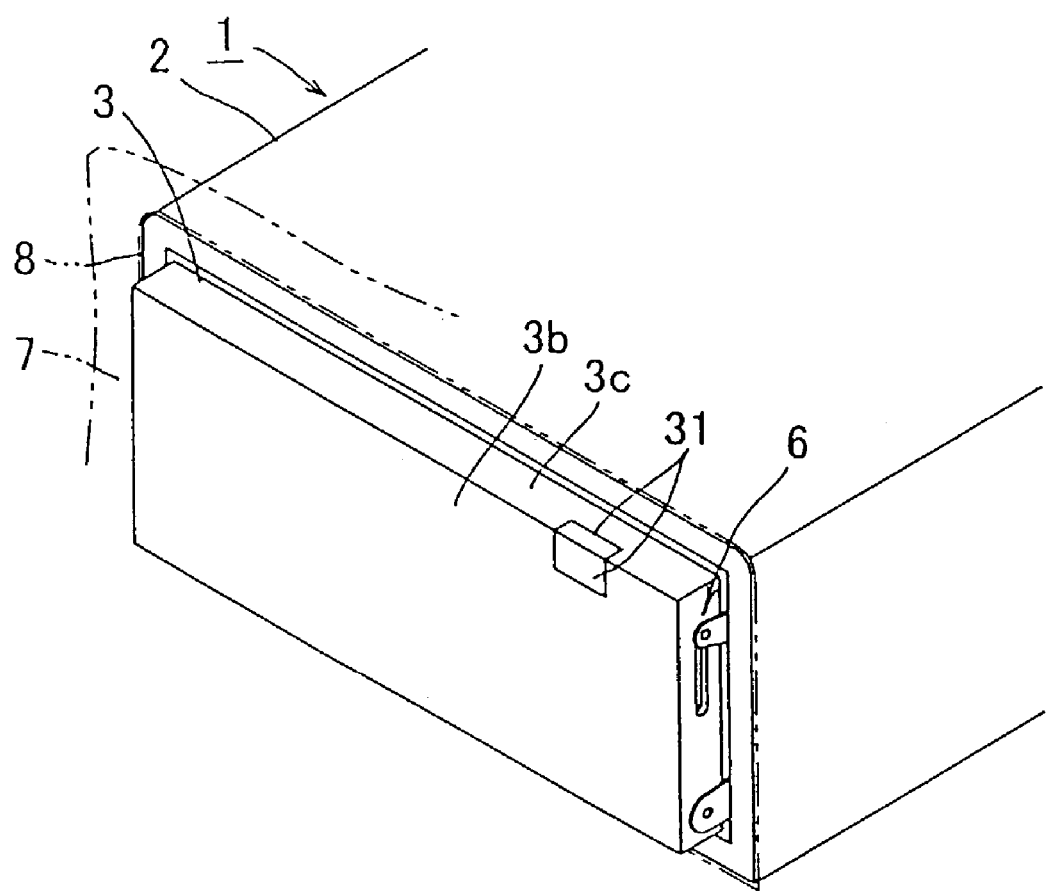
FIG. 2 is a perspective view showing the automotive electronic device according to the first embodiment in a using state.
Figure 3:
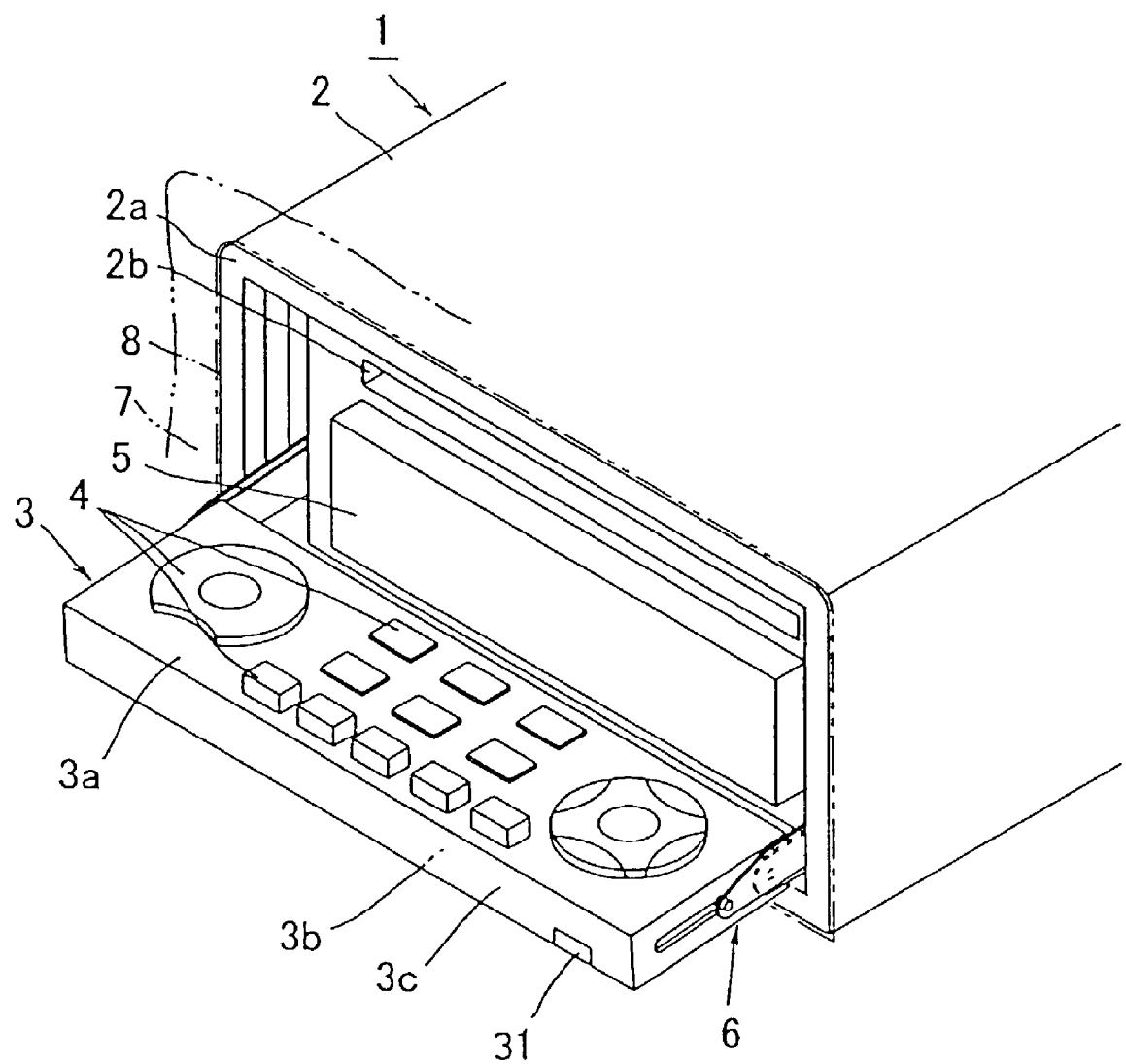
FIG. 3 is a perspective view showing the automotive electronic device according to the first embodiment in a using state.

FIGS. 1 to 3 are perspective views of a CD player 1 according to a first embodiment in its using state (a state in which the CD player 1 is mounted in a vehicle).

The CD player 1 comprises a device main body 2 in which a turntable for rotating a disc type recording medium (refer it to as a CD, hereinafter) or a pick-up device or the like is accommodated, a blind panel 3 with which a front surface panel 2a side of the device main body 2 is covered, an operating part (keyboard part) 4 for operating the device main body 2, a display part 5 for displaying the contents of an operation and a blind panel moving and operating mechanism 6 for moving the blind panel 3 between a shield position in which the front surface panel 2a side is hidden and an operating part usable position in which the front surface panel 2a side is exposed and the operating part 4 can be used.

The device main body 2 is formed in a flat rectangular parallelepiped and accommodated in and attached to a recessed part 8 for accommodating the device provided in a floor console 7 of a motor vehicle or the like.

The device main body 2 is provided with a recording medium insert port (refer it to as a CD insert port, hereinafter) 2b in the upper part of the front surface panel 2a side.

When the CD is inserted from the CD insert port 2b to a prescribed position, the CD is automatically pulled in by a recording medium pulling mechanism (an illustration is omitted) and chucked on the turntable.

The blind panel 3 is fitted to the recessed part 8 for accommodating the device provided in the floor console 7 shown in FIG. 1 and is movable between a first position in which the opening part of the recessed part 8 for accommodating the device is closed, a second position in which the blind panel 3 moves so as to slip out of the recessed part 8 for accommodating the device as shown in FIG. 2 and a third position in which the blind panel 3 collapses at a prescribed angle, for instance, about 90 degrees to 120 degrees as shown in FIG. 3.

The operating part 4 is arranged on a first surface (inner surface) 3a of the blind panel 3 opposed to the front surface panel 2a of the device main body 2 in the first and second positions in which the front surface panel 2a side of the device main body 2 is covered with the blind panel 3. Further, the display part 5 is arranged in the lower part of the CD insert port 2b of the front surface panel 2a of the device main body 2.

Figure 4:
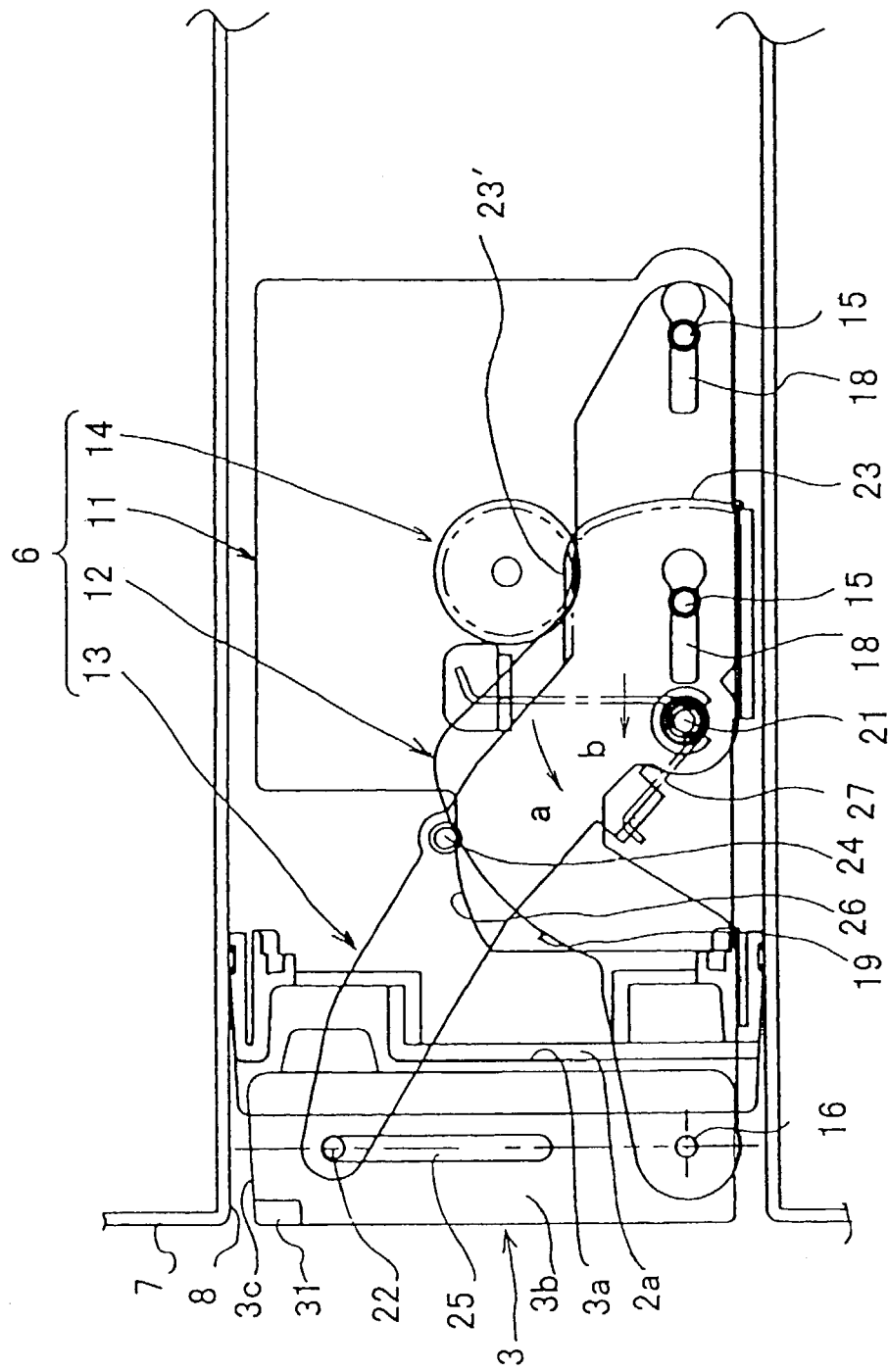
FIG. 4 is a side view of the main parts of the automotive electronic device.

As shown in FIG. 4, the blind panel moving and operating mechanism 6 includes a pair of brackets 11 provided on a chassis (an illustration is omitted) of the CD player 1, first and second blind panel support arms (refer them to as first and second arms, hereinafter) 12 and 13 attached to the pair of brackets 11 for supporting the upper and lower end parts of the side surface of the blind panel 3, an arm driving and operating part (an illustration is omitted) composed of a motor or the like for rotating the second arm 13 of the first and second arms 12 and 13 and an intermediate gear 14 by which the arm driving and operating part is interlocked with the second arm 13.

The first arm 12 is formed in a substantially triangular shape. A pair of slide guide shafts 15 and 15 are provided in the vicinity of one angular part in a bottom side. In the other angular part of the bottom side, a blind panel support shaft 16 for supporting the blind panel 3 is provided.

The pair of slide guide shafts 15 and 15 are inserted into a pair of slide guide grooves 18 and 18 provided in the bracket 11 so that the first arm 12 is attached to the bracket 11 so as to freely slide within ranges of lengths of the slide guide grooves 18. The blind panel support shaft 16 is attached to the lower end part of the side surface of the blind panel 3 so as to be rotatable. Further, the first arm 12 has, at the right part of the blind panel support shaft 16, a cam surface 19 which is engaged with a cam engaging pin 24 provided in the second arm 13.

The second arm 13 is formed in a substantially L-shape, and includes an attaching shaft 21 to the first arm 12 in the vicinity of a bent part, a blind panel support shaft 22 at one end part in the direction of length and a circular arc shaped (sector shaped) gear 23 about the attaching shaft 21 as a center at the other end part in the direction of length and a gear 23' engaged to the gear 23. Further, the second arm 13 is provided with the cam engaging pin 24 between the blind panel support shaft 22 and the circular arc shaped gear 23.

The second arm 13 is attached to the first arm 12 by the attaching shaft 21 so as to be rotatable. The blind panel support shaft 22 at one end part of the second arm 13 is inserted into a slot shaped guide groove 25 provided on the side surface of the blind panel 3 so as to freely slide.

While the blind panel support shaft 22 is located at the upper end part of the slot shaped guide groove 25, the cam engaging pin 24 contacts with a cam surface 26 provided in the bracket 11.

A torsion coil spring 27 is attached to the attaching shaft 21. The second arm 13 and the first arm 12 are urged in the direction of an arrow mark a by the torsion coil spring 27.

Now, an operation of the blind panel moving and operating mechanism 6 will be described below.

As shown in FIG. 4, while the first arm 12 is retracted inward in the device main body 2, the blind panel 3 is substantially vertically superposed on the front part of the front surface panel 2a of the device main body 2 in parallel with the front surface panel 2a. Further, as shown in FIG. 1, the blind panel 3 is fitted to the recessed part 8 for accommodating the device provided in the floor console 7 in which the device main body 2 is accommodated so that the opening part of the recessed part 8 for accommodating the device is closed.

Then, the first arm 12 is urged to the direction of the arrow mark a to move toward the direction of the arrow mark a by the urging force of the torsion coil spring 27 under the rotation of the intermediate gear 14 rotated by a driving force from the motor of the arm driving and operating part, and the second arm 13 is also moved to the direction shown by an arrow mark b. At this time, the first arm 12 is prevented from rotating by the cam surface 26 provided in the bracket 11 and moves substantially horizontally. Accordingly, while the blind panel 3 keeps a substantially vertical state, the blind panel 3 is separated by a prescribed distance from the front surface panel 2a of the device main body 2. Thus, as shown in FIG. 2, the blind panel 3 protrudes from the opening part of the recessed part 8 for accommodating the device.

The first arm 12 which moves to the left end parts of the guide grooves 18 stops its horizontal movement. Further, when the circular arc shaped gear 23 engages with the intermediate gear 14, the second arm 13 rotates counterclockwise along the cam surface 19 provided in the first arm 12.

When the second arm 13 rotates counterclockwise, the blind panel support shaft 22 provided at one end part of the second arm 13 moves downward in the slot shaped guide groove 25 provided on the side surface of the blind panel 3. Thus, the blind panel 3 rotates by 90 degrees to 120 degrees to collapse substantially horizontally as shown in FIG. 6.

Consequently, the display part 5 provided in the front surface panel 2a of the device main body 2 which has been hidden by the blind panel 3 is exposed and the operating part 4 disposed on the first surface (inner surface) 3a of the blind panel 3 is positioned in a substantially horizontal state, so that the tips of fingers are softly placed on the first surface 3a of the blind panel 3 to operate the operating part 4 with, what is called a piano touch.

Figure 5:
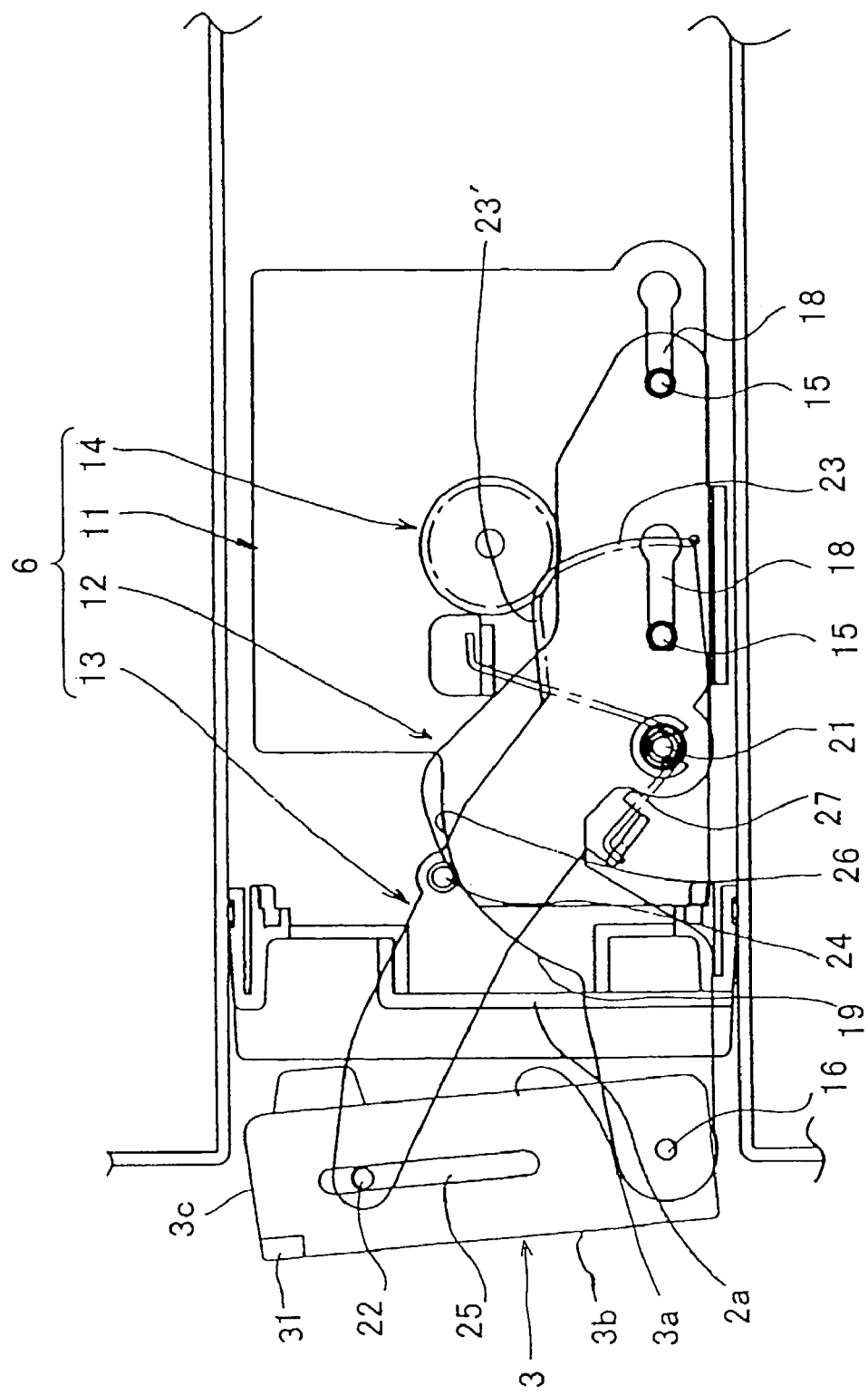
FIG. 5 is a side view of the main parts of the automotive electronic device.
Figure 6:
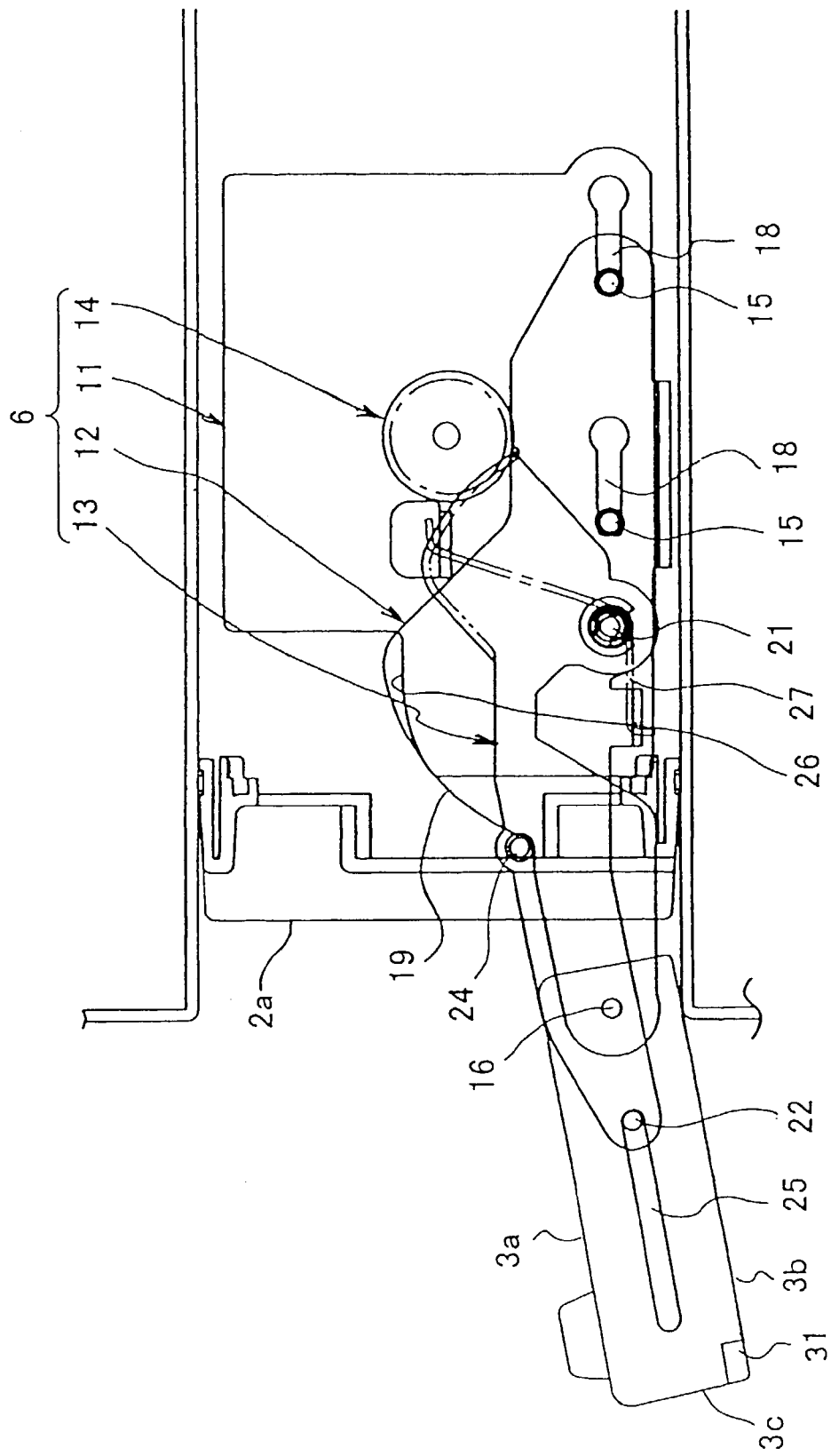
FIG. 6 is a side view of the main parts of the automotive electronic device.

When a user completely employs the CD player 1 and then leaves a vehicle, the user may reversely rotate the motor to maintain the blind panel in a state shown in FIG. 4 through a state shown in FIG. 5 from a state shown in FIG. 6.

The blind panel moving and operating mechanism 6 can be remotely operated by a remote controller.

Light receiving parts 31 of signals supplied from the remote controller are provided on a second surface (a back surface of the first surface 3a) 3b and a third surface (an end face between the first surface 3a and the the second surface 3b) 3c of the blind panel 3.

The blind panel moving and operating mechanism 6 is adapted to receive all signals from the remote controller and be driven after an ID signal is inputted by the remote controller.

The blind panel 3, especially, the second surface 3b is formed with the same material and the same color as those of the floor console 7 to assimilate it to the floor console 7 and make it unmarked when the display part 5 is covered and hidden in the first position shown in FIG. 4.

In the embodiment shown in the drawings, although the blind panel 3 is designed to have a rotary angle of about 90 degrees to 120 degrees relative to the front surface panel 2a of the device main body 2 in the third position shown in FIG. 6, the rotary angle θ is an arbitrary angle and the rotary angle θ may be adjusted without steps. Further, the blind panel 3 may be automatically moved to the first position shown in FIG. 4 when the arm driving and operating part interlocks with the engine key of a motor vehicle to bring the engine key to an OFF state. In the embodiment illustrated in the drawings, although the blind panel 3 is designed to be moved to the second position shown in FIG. 5 from the first position shown in FIG. 4 and then to be rotated to the third position shown in FIG. 6 in order to prevent the blind panel 3 from interfering with the front surface panel 2a of the device main body 2 upon rotating the blind panel 3, when there is not a possibility that the blind panel 3 may possibly interfere with the front surface panel 2a of the device main body 2, the blind panel 3 may be directly rotated from the first position to the third position.

Figure 7:
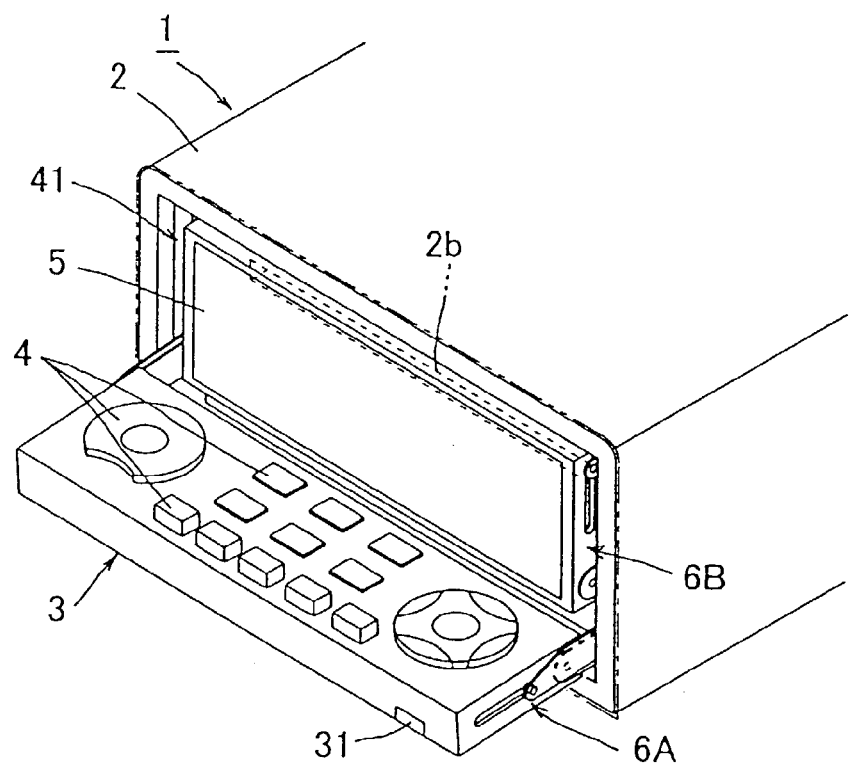
FIG. 7 is a perspective view of an automotive electronic device according to a second embodiment in a using state.
Figure 8:
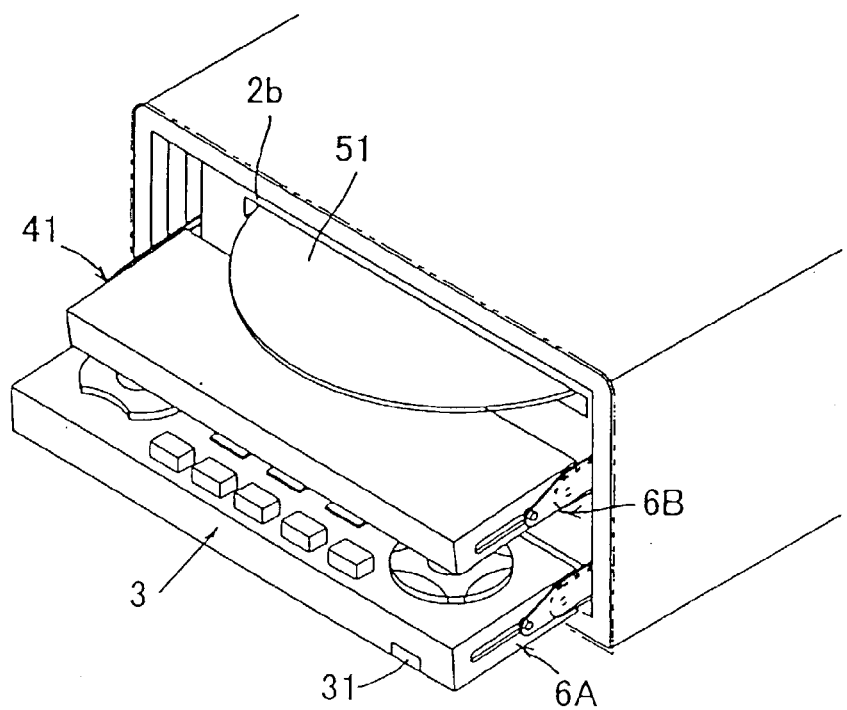
FIG. 8 is a perspective view of the automotive electronic device according to the second embodiment in a using state.
Figure 9:
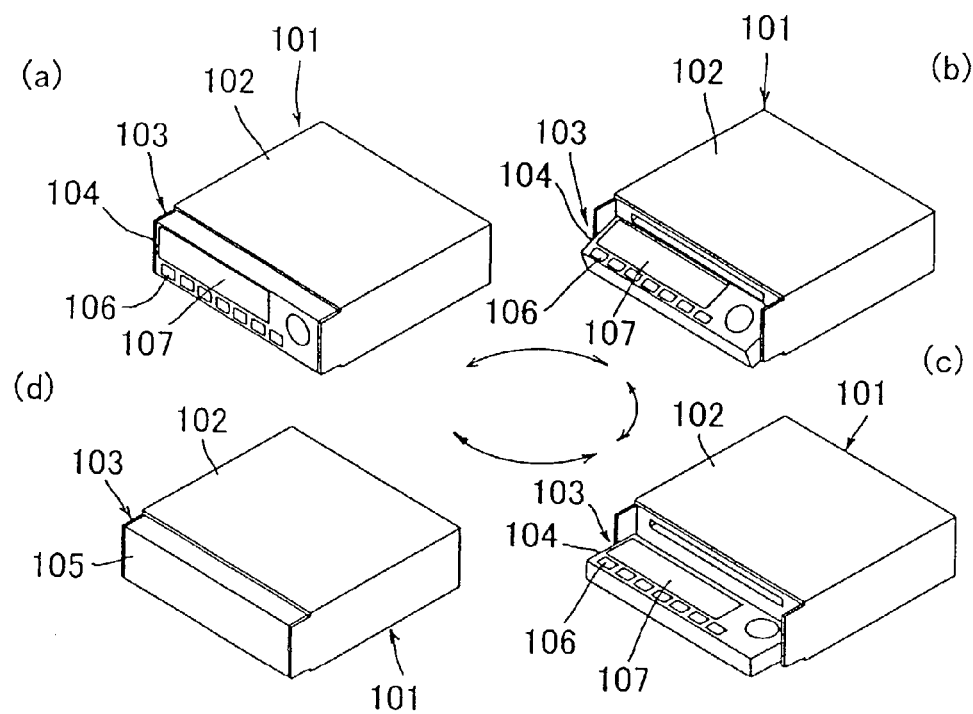
FIG. 9 is a perspective view of a conventional example.
Figure 10:
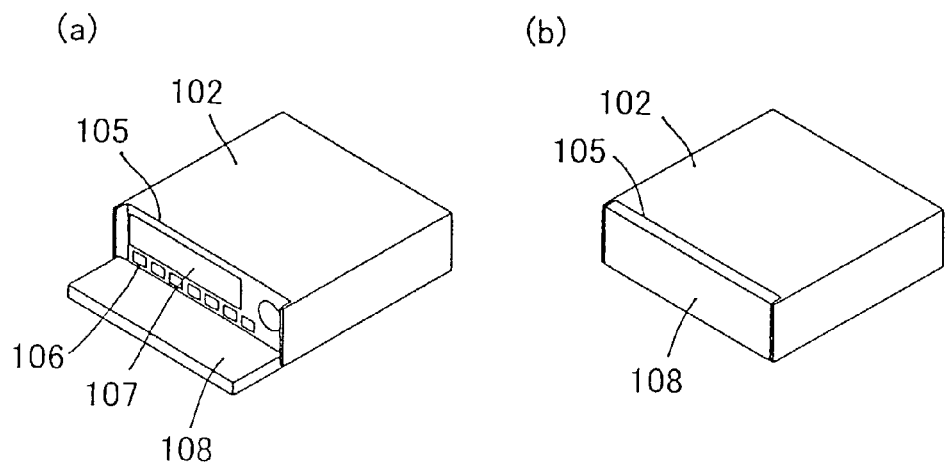
FIG. 10 is a perspective view of a conventional example.

FIGS. 7 and 8 show a second embodiment. In this embodiment, the size of a display part 5 is enlarged more than that of the first embodiment so that the display part 5 is more visible.

That is, in the first embodiment, the display part 5 is attached integrally to the front surface panel 2a of the device main body 2. The CD insert port 2b is provided in the upper part of the front surface panel 2a of the device main body 2. Accordingly, the display part 5 needs to be provided at a position lower than that of the CD insert port 2b so that the display part 5 does not interfere with the insertion of the CD. Thus, the size of the display part 5 is the more limited.

In the second embodiment, the display part 5 is provided over a substantially entire area of the front surface of a moving panel 41 (the moving panel 41 provided with the display part 5 is referred to as a display panel, hereinafter).

The display panel 41 can be rotated and moved between a using position (see FIG. 7) in which the display panel 41 is superposed on the front surface side of a device main body 2 and a non-using position (see FIG. 8) in which the display panel 41 collapses at a prescribed inclination angle relative to the front surface side of the device main body 2.

At the position shown in FIG. 7 where the display panel 41 is superposed on the front surface side of the device main body 2, the upper end part of the display panel 41 is located at a position higher than a CD insert port 2b to close the CD insert port 2b.

When the display panel 41 is rotated by about 90 degrees from the using position shown in FIG. 7 to move to the non-using position shown in FIG. 8, the CD insert port 2b is exposed.

A blind panel 3 is driven and operated by a blind panel moving and operating mechanism 6A having the same structure as that of the blind moving and operating mechanism 6 described in the first embodiment. The display panel 41 is driven and operated by a display panel moving and operating mechanism 6B having the same structure as that of the blind panel moving and operating mechanism 6.

The blind panel 3 is driven and operated by the blind panel moving and operating mechanism 6A so that the blind panel 3 collapses substantially horizontally. Then, when a CD is inserted into the CD insert port 2b as required, an operating key provided in the operating part 4 of the blind panel 3 is pressed. Thus, the display panel moving and operating mechanism 6B operates to rotate the display panel 41 in a horizontal direction so that the CD insert port 2b provided on the front surface of the device main body 2 appears as shown in FIG. 8, and accordingly, the CD 51 can be inserted into the CD insert port 2b. Then, after the CD 51 is completely inserted into the CD insert port 2b, the operating key is pressed again. Thus, the display panel moving and operating mechanism 6B operates to move the display panel 41 to an original vertical position. Since other structures are substantially the same as those of the first embodiment, a duplicated description is omitted.

Since a CD player 1 of the second embodiment has the structure as mentioned above, the display part 5 of the display panel 41 can be made larger than that of the first embodiment to be more visible.

In the above-described embodiments, although the CD player is described as one example of the automotive electronic device, the automotive electronic device is not limited to the CD player and may be widely applied to various automotive electronic devices such as a DVD player, a car navigation device, etc.

As mentioned above, the automotive electronic device according to the present invention has such effects as described below.

(1) Since the display part and the operating part are separately arranged on the device main body and the blind panel, respectively, the display part or the operating part can be more enlarged, the display part can be more easily viewed and the operating part can be more readily operated than the conventional automotive electronic device in which both the display part and the operating part are arranged on the same surface.

(2) One blind panel support arm of a pair of blind panel support arms for supporting the blind panel is rotated by the arm driving and operating part so that the blind panel can be moved and rotated between the shield position and the operating part usable position about the blind panel support shaft of the other blind panel support arm as a center.

(3) Since the rotary angle of the operating part is set to a range of 90 degrees to 120 degrees relative to the display part, the operating part can be operated with the so-called piano touch. The tips of fingers by which the operating part is operated can be prevented from interfering with the display part when the display part is viewed.

(4) The display part is enlarged to a position where the recording medium insert port provided in the front surface side of the device main body is closed thereby so that the display part can be more enlarged and the display part can be more easily viewed.

What is claimed is:

1. An automotive electronic device comprising:
 a device main body having a front surface side;
 a blind panel for covering the front surface side of the device main body;
 an operating part for operating the device main body;
 a display part for displaying contents of an operation, said display part being arranged at the front surface side of the device main body; and
 a blind panel moving and operating mechanism for moving the blind panel between a shield position where the front surface side of the device main body is covered and shielded and an operating part usable position where the front surface side is exposed and the operating part can be used, wherein the operating part is arranged on a surface opposed to the front surface of the device main body when the blind panel is in the shield position.

2. The automotive electronic device according to claim 1, wherein the blind panel moving and operating mechanism includes a bracket, a pair of blind panel support arms attached to the bracket and supporting the blind panel by a blind panel support shaft at an end thereof, and an arm driving and operating part for rotating one blind panel support arm of the pair of blind panel support arms so that the blind panel is rotated between the shield position and the operating part usable position about the blind panel support shaft of the other blind panel support arm.

3. The automotive electronic device according to claim 1, wherein the blind panel is rotated at a rotary angle of between 90 degrees to 120 degrees from the display part in the exposed position thereof.

4. The automotive electronic device according to claim 1, wherein the display part is provided in a movable panel movable between a first position where the movable panel is superposed on the front surface side of the device main body and a second position where the movable panel collapses at a prescribed inclination angle relative to the front surface side of the device main body, and when the movable panel is moved to the second position a recording medium insert port provided in the front surface side of the device main body is exposed.

5. The automotive electronic device according to claim 1, wherein the surface on which the operating part is arranged is not the same as that on which the display part is arranged.

* * * * *